(12) United States Patent
Tendick et al.

(10) Patent No.: US 9,906,647 B2
(45) Date of Patent: Feb. 27, 2018

(54) MANAGEMENT OF CONTACT CENTER GROUP METRICS

(71) Applicant: Avaya Inc., Santa Clara, CA (US)

(72) Inventors: Patrick Tendick, Basking Ridge, NJ (US); Lorraine Denby, Berkeley Heights, NJ (US); Wen-Hua Ju, Monmouth Junction, NJ (US)

(73) Assignee: Avaya Inc., Santa Clara, CA (US)

( * ) Notice: Subject to any disclaimer, the term of this patent is extended or adjusted under 35 U.S.C. 154(b) by 264 days.

(21) Appl. No.: 14/626,762

(22) Filed: Feb. 19, 2015

(65) Prior Publication Data
US 2016/0248912 A1    Aug. 25, 2016

(51) Int. Cl.
*H04M 3/00* (2006.01)
*H04M 3/51* (2006.01)

(52) U.S. Cl.
CPC ................. *H04M 3/5175* (2013.01)

(58) Field of Classification Search
CPC ............ H04M 3/5175; H04M 3/5233; H04M 3/5183; H04M 3/523; H04M 3/5232; H04M 3/5191; H04M 3/51; H04M 3/5158; H04M 3/5238
USPC ............... 379/265.05, 265.11–265.12, 265.1, 379/265.03
See application file for complete search history.

(56) References Cited

U.S. PATENT DOCUMENTS

| 6,970,829 B1 * | 11/2005 | Leamon | G06Q 10/06 370/270 |
| 7,088,814 B1 * | 8/2006 | Shaffer | H04M 3/5233 379/265.01 |
| 7,676,034 B1 * | 3/2010 | Wu | H04M 3/5233 379/265.01 |
| 7,725,339 B1 * | 5/2010 | Aykin | G06Q 10/06311 705/7.14 |
| 8,079,066 B1 * | 12/2011 | Cordell | G06F 21/41 713/150 |
| 8,300,798 B1 * | 10/2012 | Wu | H04M 3/5233 379/265.11 |

(Continued)

OTHER PUBLICATIONS

"Genesys Reporting Technical Reference 8.0 Overview," Genesys Telecommunications Laboratories, Inc., Jan. 2014, retrieved from http://docs.genesys.com/Special:Repository/80lrtr_overview. pdf?id=ad98f748-4efd-44f6-acaf-8a1466f2bfbf, 144 pages.

(Continued)

*Primary Examiner* — Rasha Al Aubaidi
(74) *Attorney, Agent, or Firm* — Sheridan Ross P.C.

(57) ABSTRACT

To provide better metrics for a contact center, the system determines when a contact center agent has been assigned to a plurality of agent skills in a skill group. A skill group is a set of skills for which the contact center seeks to calculate overall metrics across those skills. Information is received that the contact center agent is in a first state for the plurality of agent skills. For example, the contact center agent is available to support the different products. A status is calculated for the contact center agent in the skill group. The status for the contact center agent in the skill group is calculated based a minimum or maximum of the first state of the contact center agent in the skill group. The status of the first agent in the skill group is sent to a contact center administrator to better manage the contact center.

20 Claims, 5 Drawing Sheets

(56) References Cited

U.S. PATENT DOCUMENTS 8,488,769 B1 7/2013 Noble et al.
2010/0054453 A1* 3/2010 Stewart ............... H04M 3/5232
379/265.12

OTHER PUBLICATIONS

"Cisco Unified Contact Center Enterprise Reporting User Guide 10.5(1)," Cisco Systems, Inc., Jun. 18, 2014, retrieved from http://www.cisco.com/c/en/us/td/docs/voice_ip_comm/cust_contact/contact_center/icm_enterprise/icm_enterprise_10_5_1/User/Guide/UCCE_BK_U38DBA90_00_ucce-reporting-user-guide.pdf, 250 pages.

* cited by examiner

MANAGEMENT OF CONTACT CENTER GROUP METRICS

TECHNICAL FIELD

The systems and methods disclosed herein relate to contact centers and in particular to management of contact center metrics.

BACKGROUND

The goal of a contact center is to run as efficiently as possible. In order to maximize efficiency and profitability, contact center managers need good information to make business decisions and predictions. With more accurate information, the contact center managers and administrators can make better decisions and react to changing conditions in real-time. Currently, contact center managers rely heavily on measures related to agent staffing and availability, such as, the number of agents staffed, the number of available agents, agent occupancy, and time spent on break. This information is also used to track agents for managing a specific type of skill. For example, a supervisor can view the number of agents currently handling calls for a specific type of product (i.e., a skill).

Today, this contact center information is hard to measure and aggregate because older contact center systems were designed for single locations that handled a relatively small number of skills. While it has long been possible to assign an agent to multiple skills, reporting for these types of contact centers is far less sophisticated than is needed today where a contact center could have hundreds or thousands of different skills, thousands of agents, and multiple locations. For large contact centers, it would be useful to know metrics for an entire group of skills, e.g., how many agents are staffed across all direct sales skills. Current systems have limitations for choosing multiple levels of detail in reporting. In addition, there are limits for getting near real-time information to allow an administrator to react quickly and appropriately to problems. While metrics are available for each individual skill, some key metrics cannot be directly rolled up into metrics at a skill group level. A skill group is a set of skills for which the contact center seeks to calculate overall metrics across those skills. For example, the contact center might want to know how many calls came in for tech support skills, how many agents were staffed in those skills, and how many agents were handling calls from those skills. When agents are assigned to support multiple skills at the same time, it is important to also be able to correctly track and manage this information in order to properly manage contact center resources. However, in current systems, when an agent is assigned to multiple skills within a skill group, the status of the agent in the skill group is either not available or incorrectly counted.

SUMMARY

Systems and methods are provided to solve these and other problems and disadvantages of the prior art. To provide better metrics for a contact center, the system determines when a contact center agent has been assigned to a plurality of agent skills in a skill group. The skill group is a grouping of skills for the purpose of reporting and management of a contact center. Information is received that the contact center agent is in a first state for the plurality of agent skills. For example, the contact center agent is available to support different products. A status is calculated for the contact center agent in the skill group. The status for the contact center agent in the skill group is calculated based a minimum or maximum of the first state of the contact center agent in the skill group. The status of the first agent in the skill group is sent to a contact center administrator at an administration terminal to better manage the contact center.

DETAILED DESCRIPTION

Figure 1:
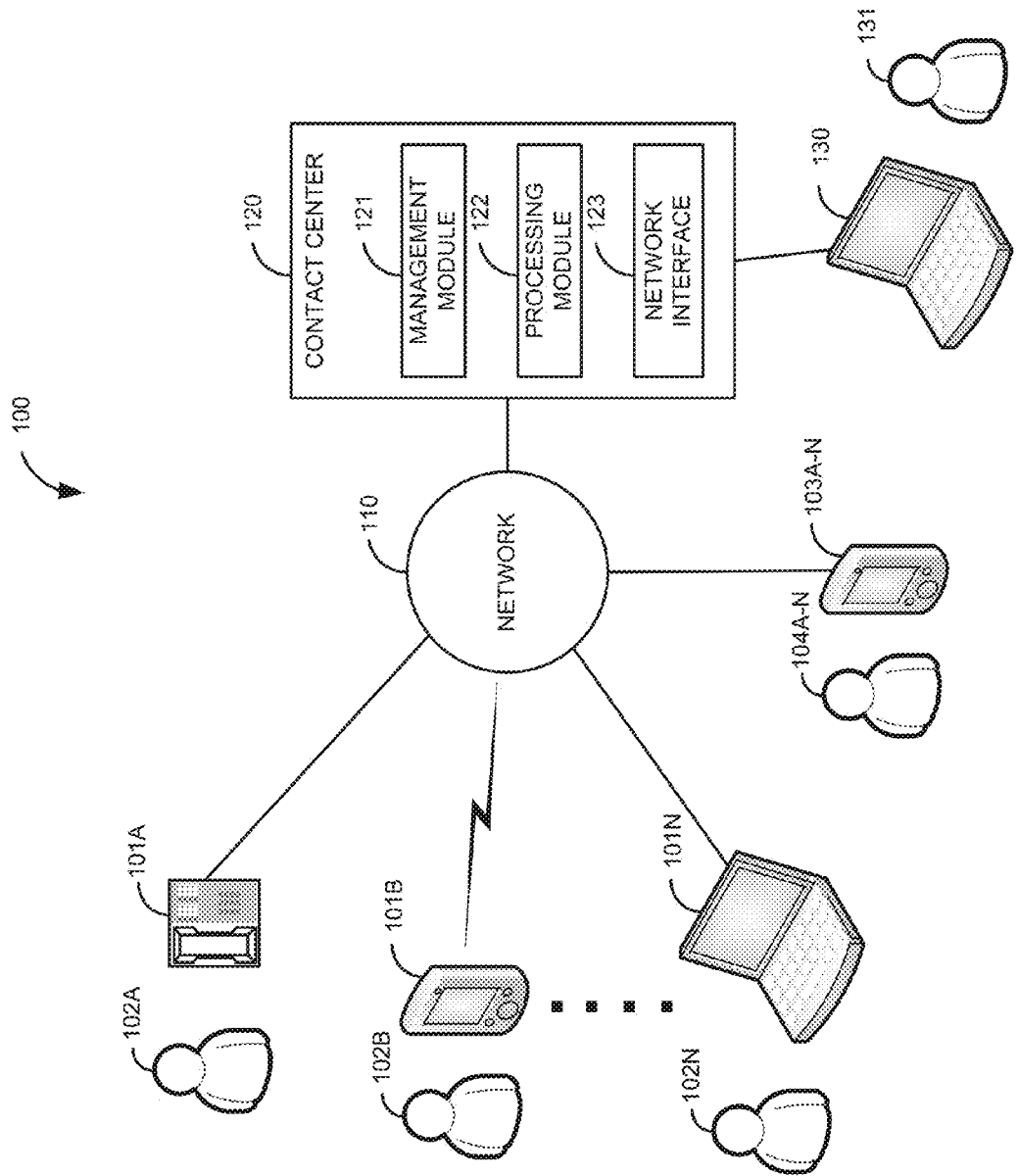
FIG. 1 is a block diagram of a first illustrative system for managing contact center group metrics.

FIG. 1 is a block diagram of a first illustrative system 100 for managing contact center group metrics. The first illustrative system 110 comprises agent terminals 101A-101N, customer devices 103A-103N, a network 110, a contact center 120, and an administration terminal 130.

The agent terminal 101 can be or may include any device that a contact center agent 102 can use to communicate on the network 110, such as a Personal Computer (PC), a telephone, a video system, a cellular telephone, a Personal Digital Assistant (PDA), a tablet device, a notebook device, a smart phone, and the like. In FIG. 1, each agent terminal 101A-101N has an associated contact center agent 102A-102N. As shown in FIG. 1, any number of agent terminals 101A-101N may be connected to the network 110, including only a single agent terminal 101. In addition, the agent terminal 101 may be directly connected to the contact center 120.

The customer devices 103A-103N can be or may include any device that a customer 104A-104N can use to communicate with the contact center 120, such as, a Personal Computer (PC), a telephone, a video system, a cellular telephone, a Personal Digital Assistant (PDA), a tablet device, a notebook device, a smart phone, and the like.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Integrated Services Digital Network (ISDN), video protocols, email protocols, Instant Messaging protocols, text messaging protocols, and/or the like. Thus, the network 110 is an electronic communication network that allows for sending of messages via packets and/or circuit switched communications.

In FIG. 1, only a single network 110 is shown. However, in other embodiments, multiple networks 110 may be used. For example, the customer devices 103A-103N may reside on the Internet and the agent terminals 101A-101N may reside on a private corporate network.

The contact center 120 can be or may include any hardware/software that can manage contact center resources, such as a Private Branch Exchange (PBX), a server, a router, a communication manager, a video switch, a text messaging server, an Instant Messaging (IM) server, an email server, and/or the like. The contact center 120 can handle a variety of contacts from customers, such as voice contacts, video contacts, email contacts, IM contacts, text contacts, social network contacts, and/or the like. Typically, the contact center 120 will receive incoming or send outgoing contacts from a contact center agent 102 at an agent terminal 101 to a customer 104 at a customer device 103. The contact center further comprises a management module 121, a processing module 122, and a network interface 123.

The management module 121 can be or may include any hardware/software that can manage information for the contact center 120, such as a reporting system, a management system, a data handling system, and/or the like. The management module 121 may use other resources, such as a database (not shown).

The processing module 122 can be or may include any hardware/software that can process data for managing the contact center 120. The network interface 123 can be any hardware that can send and receive information on the network 110, such as an Ethernet interface, a WiFi interface, an optical interface, a wireless interface, a wired interface, and/or the like.

The administration terminal 130 can be or may include any device that a contact center administrator 131 can use to administer the contact center 120, such as a Personal Computer (PC), a telephone, a video system, a cellular telephone, a Personal Digital Assistant (PDA), a tablet device, a notebook device, a smart phone, and the like.

Figure 2:
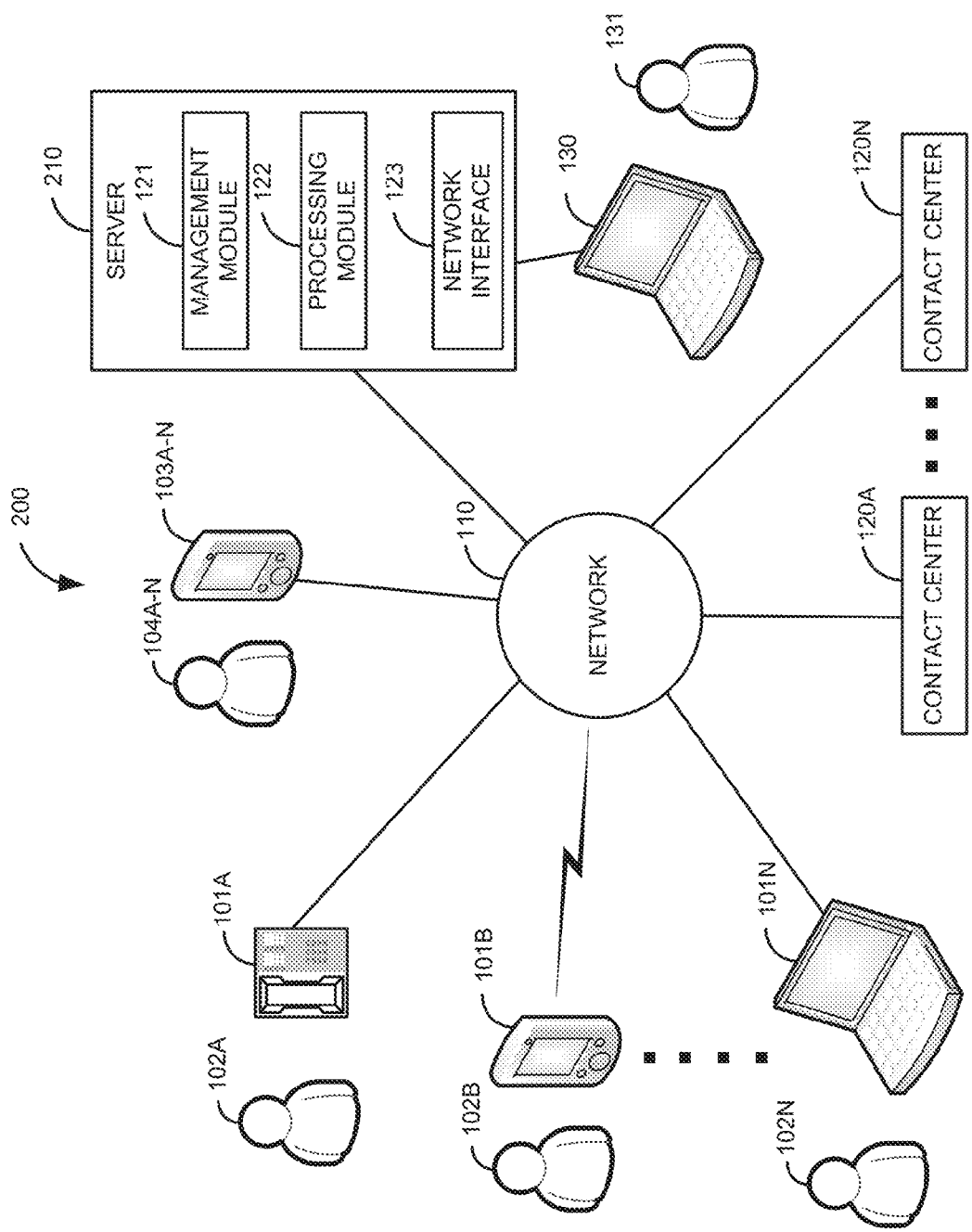
FIG. 2 is a block diagram of a second illustrative system for managing contact center metrics in multiple contact centers.

FIG. 2 is a block diagram of a second illustrative system 200 for managing contact center metrics in multiple contact centers 120A-120N. The second illustrative system 200 comprises the agent terminals 101A-101N, the customer devices 103A-103N, the network 110, contact centers 120A-120N, a server 210, and the administration terminal 130.

The server 210 can be or may include any hardware/software that can communicate on the network 110, such as a communication system, a server, a front-end server, a management server, and/or the like. In this embodiment, the server 210 is used to gather statistics from each of the contact centers 120A-120N to provide an overall set of statistics/information for the contact centers 120A-120N. The server 210 includes the management module 121, the processing module 122, and the network interface 123.

In another embodiment, the functionality of the server 210 for gathering the statistics from all of the contact centers 120A-120N may be implemented in one of the contact centers 120. For example, the contact center 120A may include the elements 121-123 and manage statistics for all of the contact centers 120A-120N.

In FIG. 2, the contact centers 120A-120N are at different locations. For example, the contact center 120A can be in one city/country and the contact center 120N can be in a different city/country.

Figure 3:
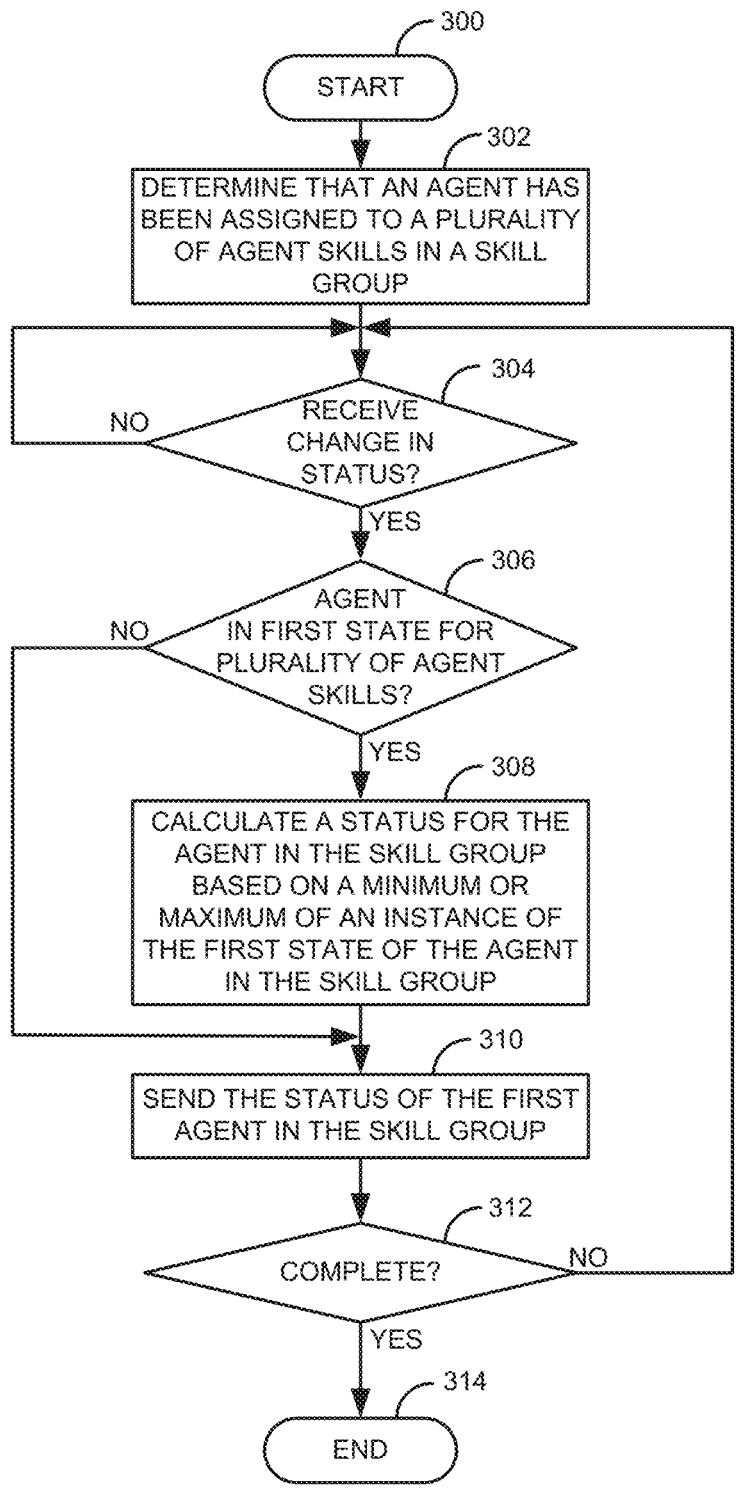
FIG. 3 is a flow diagram of a process for managing contact center group metrics.
Figure 4:
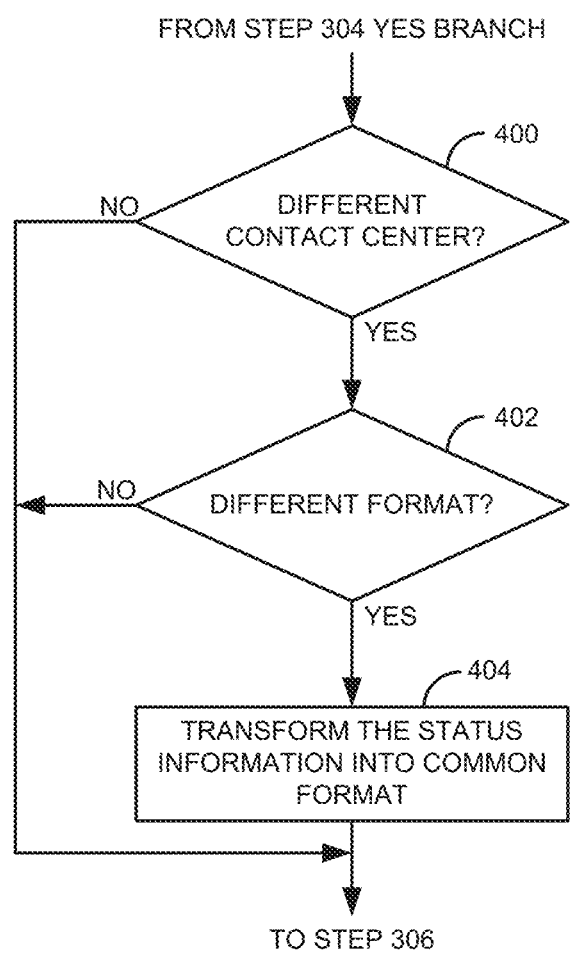
FIG. 4 is a flow diagram of a process for managing contact center information from different contact centers in different formats.
Figure 5:
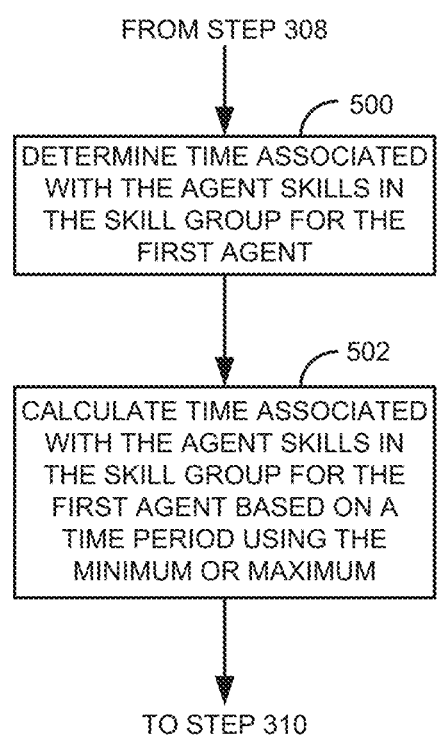
FIG. 5 is a flow diagram of a process for calculating times associated with a skill group.

FIG. 3 is a flow diagram of a process for managing contact center group metrics. Illustratively, the agent terminals 101A-101N, the customer devices 103A-103N, the contact center 120, the management module 121, the processing module 122, the network interface 123, and the administration terminal 130 the are stored-program-controlled entities, such as a computer or processor, which performs the method of FIGS. 3-5 and the processes described herein by executing program instructions stored in a tangible computer readable storage medium, such as a memory or disk. Although the methods described in FIGS. 3-5 are shown in a specific order, one of skill in the art would recognize that the steps in FIGS. 3-5 may be implemented in different orders and/or be implemented in a multi-threaded environment. Moreover, various steps may be omitted or added based on implementation.

When the contact center agents 102A-102N log in and handle contacts initiated to and/or from customers 104A-104N, the management module 121 tracks various statistics associated with the contact center agents 102A-102N. A contact center 120 may support different products and/or services. For example, the contact center 120 may provide technical support for the Products A, B, C, and D along with sales support for the Products A, B, and C. In the contact center 120, the contact center agents 102A-102N will have skills in some or all of the products the contact center 120 supports. For instance, the contact center agent 102A may be capable of providing technical support for the Products A, B, and C, the contact center agent 102B may only be able to provide technical support for the Products C and D, and contact center agent 102N may be able to provide sales support for the Products A, B, and C.

Because some of the contact center agents 102A-102N can handle multiple skills (e.g., products), the contact center 120 can better utilize the agent's skills to handle contact center communications. For example, if there is a heavy call load for technical support for the Product C, both the contact center agents 102A and 102B can be called upon to support communications from customers for the Product C. To do this, a contact center agent 102 is assigned to a particular skill. For example, the contact center agent 102A can be assigned for technical support for the Products A, B, and C. Likewise, the contact center agent 102B can be assigned to technical support for the Products C and D. The contact center agent 102N can be assigned to sales support for the Products A, B, and C.

A contact center administrator 131, via the administration terminal 130, may want to track a contact center agent (or agents) 102 by using a skill group. A skill group is based on a two or more agent skills defined by the contact center administrator 131. For example, a contact center administrator 131 can create a skill group for technical support for the Products A, B, and C. This allows the contact center administrator 131 to track the status of agents who have skills for the Products A, B, and C as it relates to those skills. For a skill group, an agent may be assigned to all of the agent skills in the skill group or to a subset of agent skills in the skill group.

With respect to a particular skill to which an agent 102 has been assigned (is logged in), the agent can have one of several possible states:

Available—The agent 102 is logged into the skill and is available to handle communications.

In Auxiliary—The agent 102 is logged into the skill, but is in an auxiliary state, e.g., on break or in training.

On Communication—The agent 102 is logged into the skill and is handling a communication for that skill Other—The agent 102 is logged into the skill, but is handling a communication in a different skill or is engaged in some other type of activity.

Within a skill, specific statistics can be tracked. For example, the following statistics are commonly used to track the number of agents 102 in the states above for a skill:

Staffed Count—The count of agents 102 who are assigned to the skill, i.e., are logged into the skill Available Count—The count of agents 102 who have logged into the skill and are available to handle communications.

In Auxiliary Count—The count of agents 102 who have logged into the skill, but are in an auxiliary state, e.g., on break or in training.

On Communication Count—The count of agents 102 who are logged into the skill and are handling a communication for the skill Other Count—The count of agents 102 who are logged into the skill, but are handling a communication in a different skill or are engaged in some other type of activity.

The management module 121 can track these same statistics, but for a skill group, defined as follows:

Skill Group Staffed Count—The count of agents 102 who are assigned to one or more skills in the skill group, i.e., are logged into the skill(s).

Skill Group Available Count—The count of agents 102 who have logged into to one or more skills in the skill group and are available to handle communications.

Skill Group In Auxiliary Count—The count of agents 102 who have logged into one or more skills in the skill group, but are in an auxiliary state, e.g., on break or in training.

Skill Group On Communication Count—The count of agents 102 who are logged into one or more skills in the skill group and are handling a communication for one of those skills Skill Group Other Count—The count of agents 102 who are logged into one or more skills in the skill group, but are handling a communication in a skill in a different skill group or are engaged in some other type of activity.

In addition to metrics that count the number of agents 102 in each state, it is important to know the amount of time agents 102 spend in each state in a given time interval. The following statistics are used to track time in states for agents assigned to a skill:

Staffed Time—The amount of time in the interval agents 102 spent logged into the skill Available Time—The amount of time in the interval agents 102 were logged into the skill and were available to handle communications.

On Communication Time—The amount of time in the interval agents 102 were logged into the skill and were handling a communication for the skill In Auxiliary Time—The amount of time in the interval agents 102 were logged into the skill, but were in an auxiliary state, e.g., on break or in training.

Other Time—The amount of time in the interval agents 102 were logged into the skill, but were handling a communication in a different skill or were engaged in some other type of activity.

The management module 121 can track these same statistics, but for a skill group, defined as follows:

Skill Group Staffed Time—The amount of time in the interval agents 102 spent logged into one or more skills in the skill group.

Skill Group Available Time—The amount of time in the interval agents 102 were logged into one or more skills in the skill group and were available to handle communications.

Skill Group On Communication Time—The amount of time in the interval agents 102 were logged into one or more skills in the skill group and were handling a communication for one of those skills Skill Group In Auxiliary Time—The amount of time in the interval agents 102 were logged into the skill, but were in an auxiliary state, e.g., on break or in training.

Skill Group Other Time—The amount of time in the interval agents 102 were logged into the skill, but were handling a communication in a different skill or were engaged in some other type of activity.

The various statistics for a skill group can be displayed on the administration terminal 130 to an administrator/supervisor to better manage the contact center 120. For example, Table 1 shows an Exemplary table of multiple agents 102 (agents 102A-102N) that have been assigned to support multiple skills and are in multiple skill groups (skill groups 1 and 2). Table 1 also shows the amount of time each agent 102 was available in each state: Staffed, Available, On Communication, In Auxiliary, or Other. Table 1 is representative of the type of information that is available today at the agent level.

Knowing the states of individual agents 102 is not that helpful for easily finding the number of agents 102 staffed in a skill group; however, table 1A is more useful for tracking agents 102 staffed in a skill Table 1A shows that Technical Support for Products A-C each have 4 agents 102A-102N staffed. In addition, Technical Support for Product A is On Communication, while Technical Support for Products B-C have zero calls answered. To obtain the number of calls answered for Skill Group 1, which consists of Technical Support for Products A-C, the calls answered for each of the skills are added up. However, the number of agents 102 staffed in each skill cannot be simply added up to get the number of agents 102 staffed in the entire skill group. Adding up the agents staffed yields a total of 12 agents 102 staffed for Skill Group 1, which is clearly wrong since there are only 4 agents 102 involved.

TABLE 1

Agents, States, and State Times

| Skill Group | Skill | Agent | State | Calls Answered | Staffed Time | Available Time | On Communication Time | In Auxiliary Time | Other Time |
|---|---|---|---|---|---|---|---|---|---|
| 1 | TS Product A | 102A | Available | 1 | 60 | 30 | 30 | 0 | 0 |
| 1 | TS Product A | 102B | In Auxiliary | 0 | 60 | 40 | 0 | 20 | 0 |
| 1 | TS Product A | 102C | On Communication | 1 | 60 | 15 | 45 | 0 | 0 |
| 1 | TS Product A | 102N | Other | 0 | 60 | 0 | 0 | 0 | 60 |

TABLE 1-continued

Agents, States, and State Times

| Skill Group | Skill | Agent | State | Calls Answered | Staffed Time | Available Time | On Communication Time | In Auxiliary Time | Other Time |
|---|---|---|---|---|---|---|---|---|---|
| 1 | TS Product B | 102A | Available | 0 | 60 | 30 | 0 | 0 | 30 |
| 1 | TS Product B | 102B | In Auxiliary | 0 | 60 | 40 | 0 | 20 | 0 |
| 1 | TS Product B | 102C | Other | 0 | 60 | 15 | 0 | 0 | 45 |
| 1 | TS Product B | 102N | Other | 0 | 60 | 0 | 0 | 0 | 60 |
| 1 | TS Product C | 102A | Available | 0 | 60 | 30 | 0 | 0 | 30 |
| 1 | TS Product C | 102B | In Auxiliary | 0 | 60 | 40 | 0 | 20 | 0 |
| 1 | TS Product C | 102C | Other | 0 | 60 | 15 | 0 | 0 | 45 |
| 1 | TS Product C | 102N | Other | 0 | 60 | 0 | 0 | 0 | 60 |
| 2 | Sales | 102N | On Communication | 1 | 60 | 0 | 60 | 0 | 0 |

TABLE 1A

Agent State Metrics for Skills

| Skill Group | Skill | Calls Answered | Staffed Count | Available Count | On Communication Count | In Auxiliary Count | Other Count |
|---|---|---|---|---|---|---|---|
| 1 | TS Product A | 2 | 4 | 1 | 1 | 1 | 1 |
| 1 | TS Product B | 0 | 4 | 1 | 0 | 1 | 2 |
| 1 | TS Product C | 0 | 4 | 1 | 0 | 1 | 2 |
| 2 | Sales | 1 | 1 | 0 | 1 | 0 | 0 |

Using the information from the Table 1, a contact center administrator 131 can look at an individual skill in a skill group and a specific statistic for an Agent 102. For example, Table 2 shows an exemplary skill group (skill group 1) for the contact center agents 102A-102N for the agent skills: Technical Support Product A, Technical Support Product B, and Technical Support Product C. The calculations in Table 2 are for the statistic Skill Group Available Count (described above).

TABLE 2

Calculation of Skill Group Available Count for a Skill Group

| Agent Skill | Agent 102A | Agent 102B | Agent 102C | Agent 102N | All Agents (Sum) |
|---|---|---|---|---|---|
| TS Product A | 1 | 0 | 0 | 0 | 1 |
| TS Product B | 1 | 0 | 0 | 0 | 1 |
| TS Product C | 1 | 0 | 0 | 0 | 1 |
| Sum | 3 | 0 | 0 | 0 | 3 |
| Skill Group 1 | 1 1 Agent Available | 0 No Agent Available | 0 No Agent Available | 0 No Agent Available | 1 Skill Group Available Count for the Skill Group |

Table 2 shows the availability for the contact center agents 102A-102N and illustrates the calculation of Skill Group Available Count for Skill Group 1. For a given skill, Table 2 contains a 1 for each agent 102 who is available in that skill (in the Available state), and 0 for agents 102 who are not available. For example, Table 2 shows that the contact center agent 102A is available for handing communications (e.g., voice calls) with the customers 104A-104N for technical support for the Products A, B, and C. When the contact center agent 102 logs into the management module 121 the contact center agent becomes available. For example, the contact center agent 102 may be automatically logged into each agent skill and made available based on a single login. Alternatively, the contact center agent 102 may login and then indicate that the contact center agent 102 is available in each agent skill separately. In this example, the contact center agent 102A is available to handle technical support communications (e.g., communications routed from an Automatic Call Distribution (ACD) system) for the Products A, B, and C. The contact center agent 102B is not available for handling technical support communications for the Products A, B. and C. Likewise, the contact center gent 102N is not available to provide technical support for the Products A, B, and C. To calculate the Skill Group Available Count for the skill group, the processing module 122 calculates the availability of each agent 102 in the skill group. The availability of an agent 102 in the skill group is set to a 1 if the agent 102 is available in at least one skill in the skill group; otherwise, if the agent 102 is not available in any skill, the availability of the agent is set to a 0. This number can be found by taking the maximum of the availabilities of the agent 102 across skills in the skill group. Once the processing module 122 has calculated the availabilities of the agents 102 in the skill group (bottom row), the processing module 122 can calculate the Skill Group Available Count for the skill group by adding the availabilities of the individual agents 102.

By looking at the Skill Group Available Count for the skill group as calculated in Table 2, a contact center administrator 131 can quickly see how many agents 102 are currently available. In this example, there is a single agent 102 currently available. By looking at how many agents 102 are available in a skill group, the contact center administrator 131 can change agent staffing to meet changing needs of the contact center 120. For example, if there are no available agents, the contact center administrator 131 can temporarily add additional agents 102 to a skill group.

Using the above context, the process of FIG. 3 is described. The process starts in step 300. The management module 121 determines, in step 302, that a contact center agent 102 has been assigned to a plurality of agent skills in a skill group. For example, using Table 2, the management module 121 would determine that the contact center agents 102A-102N have been assigned to a plurality of agent skills in the skill group 1.

The management module 121 determines if the received status for any of the agent skills has changed in step 304. For example, the received status can change in various ways, such as when a contact center agent 102 logs into an agent terminal 101 (changing the status to staffed). Depending on an action taken by the contact center agent 102, the status of an agent in an agent skill can change from staffed to available, from available to in auxiliary, from available to on communication, from on communication to available, from available to other, from other to available, and/or the like. If the received status has not changed in step 304, the process repeats step 304.

If the received status has changed in step 304, the management module 121 determines if the contact center agent 102 is in a first state for a plurality of agent skills in step 306. For example, if the contact center agent 102A is in the available state for Products A, B, and C as shown in Table 2, the management module 121 can determine if the status is the same for each of the skill groups for each contact center agent 102. The contact center agents 102B, 102C, and 102N are not available for Products A, B, and C as shown in Table 2. If the contact center agent 102 is not in the first state for the plurality of agent skills in step 306, the process goes to step 310. Otherwise, if the contact center agent 102 is in the first state for the plurality of agent skills in step 306, the processing module 122 calculates a status for the contact center agent 102 in the skill group based on a minimum or maximum of the first state of the agent in the skill group in step 308. For example, as shown in Table 2, instead of summing the number of where the contact center agent 102A is available for technical support for the Products A, B, and C, the processing module 122 takes the maximum (1) for all the Products A, B, and C to come up with one agent available for the skill group for the contact center agent 102A. Similarly, the same process is used to calculate the availability for contact center agents 102B, 102C, and 102N (as shown in Table 2).

The network interface 123 sends the status of the first agent in the skill group to the administration terminal 130, to be viewed by the contact center administrator 131 in step 310. For example, the contact center administrator 131, via the administration terminal 130, can request to view the status for the skill group 1. The process determines in step 312 if the process is complete. If the process is not complete in step 312, the process goes to step 304. Otherwise, if the process is complete in step 312, the process ends in step 312. The metrics for individual agents can be summed to obtain the value of Available across all agents in the group.

The above example described the calculation of a skill group using the statistic Skill Group Available Count. As discussed above, the statistic Skill Group Available Count is only one of several statistics that can be used in a skill group. Table 3 illustrates the calculation of Skill the Group Other Count for Skill Group 1 (based on the same status of the agents in Table 1). As previously defined, the Skill Group Other Count is a statistic for Agents 102 working outside the skill group.

TABLE 3

Calculation of Skill Group Other Count for a Skill Group

| Skill | Agent 102A | Agent 102B | Agent 102C | Agent 102N | All Agents (Sum) |
|---|---|---|---|---|---|
| TS Product A | 0 | 0 | 0 | 1 | 1 |
| TS Product B | 0 | 0 | 1 | 1 | 2 |
| TS Product C | 0 | 0 | 1 | 1 | 2 |
| Sum | 0 | 0 | 2 | 3 | 5 |
| Skill Group 1 | 0 No Agent On Other | 0 No Agent On Other | 0 No Agent On Other | 1 1 Agent On Other | 1 Skill Group Other Count for the Skill Group |

In this example, the processing module 122 calculates the status for the contact center agent 102 based on a minimum for the agent in the skill group. In this example, the contact center agent 102A and 102B are not On Other, because the contact center agent 102A is available for Products A, B, and C (as shown in Table 1). The contact center agent 102B is On Other for products B and C. The contact center agent 102N is On Other for Products A, B, and C. In this example, a minimum is used, so only the contact center agent 102N is shown as On Other for the skill group 1.

Using Table 3, a contact center administrator 131 can quickly look at a skill group to see which agents are working outside the skill group. In this example, there is one agent 102N that is working outside the skill group as indicated the sum of all Agents On Other.

Table 4 is a showing of the skill group 1 for the Skill Group On Communication Count for skill group 1.

TABLE 4

Calculation of Skill Group On Communication Count for a Skill Group

| Skill | Agent 102A | Agent 102B | Agent 102C | Agent 102N | All Agents (Sum) |
|---|---|---|---|---|---|
| TS Product A | 0 | 1 | 0 | 0 | 1 |
| TS Product B | 0 | 0 | 0 | 0 | 0 |
| TS Product C | 0 | 0 | 0 | 0 | 0 |
| Sum | 0 | 1 | 0 | 0 | 0 |
| Skill Group 1 | 0 | 1 | 0 | 0 | 1 |

In this example, the processing module 122 calculates the value for Agents 102 On Communication based on a maximum value. Agent 102N is currently On Communication for Technical Support for Product A. By looking at Table 4, the contact center administrator 131 can easily determine (by looking at the sum) that there is currently one agent 102 On Communication for the Skill Group 1.

To illustrate, consider the following example. Assume that the contact center agent 102A's value for the Available metric is as shown in Table 2. If the contact center agent 102A's status changes from Available to On Communication for technical support for Product A, the skill group 1 value of the Available metric for the contact center agent 102A would change to 0 because the contact center agent 102A is now handing a technical support call for Product A. Likewise, if the contact center agent 102A's state changes to On Other, the contact center agent 102A's skill group 1 status would change to not available.

Similar statistics for the other metrics, such as Staffed, Auxiliary Time, On Communication, and/or the like can be calculated using the above methods. In one embodiment, information for each of the skill group statistics can be shown in a common display. For example, the contact center administrator 131 can send a request to view the statistics Available, Staffed, Auxiliary Time, On Communication, and/or Other Time in a common display for skill group 1.

FIG. 4 is a flow diagram of a process for managing contact center information from different contact centers 120 in different formats. The process of FIG. 4 goes between steps 304 and 306 of FIG. 3. After receiving a change in status in step 304, the management module 121 (in the server 210) determines if the change in status is for a second contact center agent 102 in a different contact center (e.g., contact center 120N) in step 400. If the change in status is not in a different contact center 120 in step 400, the process goes to step 306.

Otherwise, if the change is status is in a different contact center 120 in step 400, the management module 121 (in the server 210) determines if the information for the contact center agent 102 is in a different format in step 402. For example, the information in the different contact center 120 may be in a different format because the contact center 120A and the contact center 120N are disparate contact centers 120 (i.e., from different vendors). If the information is not in a different format in step 402, the process goes to step 306. Otherwise, if the information is in a different format in step 402, the management module 121 transforms the status information into a common format in step 404 and the process goes to step 306.

The management module 121 can transform the information in different formats in various ways. For example, the management module 121 can transform information from the contact center 120A (information about a first contact center agent 102 in a first format) and the contact center 120N (information about a second contact center agent 102 in a second format) into a third format (a common format). Alternatively, the management module 121 can transform the information from one of the contact centers 120 to the format of the other contact center 120.

FIG. 5 is a flow diagram of a process for calculating time in states for agents in a skill group. The process of FIG. 5 goes between steps 308 and 310 of FIG. 3. After calculating the status for the agent in the skill group in step 308, the management module 121 determines, in step 500, a time associated with the agent skills in the skill group for the contact center agent 102. For example, the contact center administrator 131 may want to see the status of available agents for the last 30 seconds. The processing module 122 calculates a time associated with the agent skills in the skill group for the contact center agent 102 based on the time period using the minimum or maximum (similar to step 308) in step 502. The process then goes to step 310 of FIG. 3.

Table 5 is an example that calculates time in the available status of skill group 1 over the last 60 seconds. In this example, the contact center agent 102A was available for technical support for each of the Products A, B, and C for 30 seconds of the last 60 seconds. In this example, which calculates the agent's availability time, the processing module 122 calculates the time available for the contact center agent 102A in skill group 1 based on the maximum all the instances (30 seconds) of the first state of the contact center agent 102A. In this example, time for the contact center agent 102A is 30 seconds in the skill group 1. Similarly, the time that the contact center agent 102B is calculated to be 40 seconds for skill group 1 and 102C is calculated to be 15 seconds for the skill group 1. The time for the contact center agent 102N is 0 seconds.

TABLE 5

Skill Group Available Time

| Skill | Agent 102A | Agent 102B | Agent 102C | Agent 102N | All Agents (Sum) |
|---|---|---|---|---|---|
| TS Product A | 30 | 40 | 15 | 0 | 85 |
| TS Product B | 30 | 40 | 15 | 0 | 85 |
| TS Product C | 30 | 40 | 15 | 0 | 85 |
| Sum | 90 | 120 | 45 | 0 | 255 |
| Skill Group 1 | 30 | 40 | 15 | 0 | 85 |

Table 6 is an exemplary table that shows a calculation based on the skill group 1 for agents On Other for a period of time. The period of time in this example is 60 seconds.

TABLE 6

Skill Group Other Time

| Skill | Agent 102A | Agent 102B | Agent 102C | Agent 102N | All Agents (Sum) |
|---|---|---|---|---|---|
| TS Product A | 0 | 0 | 0 | 60 | 60 |
| TS Product B | 30 | 0 | 45 | 60 | 135 |
| TS Product C | 30 | 0 | 45 | 60 | 135 |
| Sum | 60 | 0 | 90 | 180 | 330 |
| Skill Group 1 | 0 | 0 | 0 | 60 | 60 |

The time calculation for agents On Other is calculated in a similar manner as was previously done for the contact center agents 102A-102N On Other in Table 3 using the minimum value over the time period. In this example, the contact center agent 102A is calculated based on the minimum (0) to produce a value of 0 for the contact center agent 102A in the skill group. Likewise, the total time for the skill group 1 of the agent 102B and 102C are calculated as zero. The total time for the agent 102N is calculated at 60 seconds because the minimum time in each of the three rows for Products A, B, and C is 60 seconds. The contact center administrator 131 can look at the sum for the Skill Group 1, which is 60 seconds in this example.

Similar statistics for the other metrics, such as Staffed, Auxiliary Time, On Communication, and/or the like can be calculated using the above methods (i.e., for the same time period). In one embodiment, information for each of the skill group's statistics can be shown in a common display. For example, the contact center administrator can send a request to view the statistics Available, Staffed, Auxiliary Time, On Communication, and/or Other Time in a common display for skill group 1.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A system for managing contact center resources comprising:
   a microprocessor; and
   a computer readable medium, coupled with the microprocessor and comprising microprocessor readable and executable instructions that cause the microprocessor to execute:
      an automatic call distribution system that receives, via an electronic communication network, a plurality of electronic communications for a skill group and routes at least one of the received plurality of electronic communications for the skill group to an agent terminal of a first agent based on a calculated status of the first agent in the skill group;
      a management module that determines that the first agent has been assigned to a plurality of agent skills in the skill group and receives information that the first agent is in a first state for the plurality of agent skills in the skill group in regard to the at least one of the received plurality of electronic communications for the skill group;
      a processing module that calculates the status of the first agent in the skill group in regard to the at least one of the received plurality of electronic communications for the skill group, wherein the status of the first agent in the skill group is calculated based on a minimum or maximum of the first state for the plurality of agent skills in the skill group, wherein calculating the maximum of the first state is based on determining if the first agent is identified in the first state for at least one of the plurality of agent skills in the skill group and wherein calculating the minimum of the first state is based on determining if the first agent is identified in the first state for all of the plurality of agent skills in the skill group; and
      a network interface that sends the status of the first agent in the skill group, via an electronic computer network, to an administration terminal.

2. The system of claim 1:
   wherein the first agent is in a first contact center in a first location;
   wherein the management module determines that a second agent has been assigned to the plurality of agent skills in the skill group, wherein the second agent is in a second contact center in a second location, and receives information that the second agent is in the first state for the plurality of agent skills in the skill group; and
   wherein the processing module calculates a status of the second agent in the skill group based the minimum or maximum of the first state for the plurality of agent skills in the skill group.

3. The system of claim 2, wherein first information about the plurality of agent skills in the skill group for the first agent is in a first format and second information about the plurality of agent skills in the skill group for the second agent is in a second format and wherein the processing module transforms the first information and/or the second information into a common format.

4. The system of claim 1, wherein the first agent comprises a plurality of agents assigned to the plurality of agent skills in the skill group, wherein the management module receives information that the plurality of agents are in the first state for the plurality of agent skills in the skill group, and wherein the processing module calculates the status of the plurality of agents in the skill group based on the minimum or maximum of the first state for the plurality of agent skills in the skill group.

5. The system of claim 4, wherein the first state for the plurality of agent skills in the skill group further comprises an associated time.

6. The system of claim 1, wherein the first state for the plurality of agent skills in the skill group is that the first agent is available for a plurality of skills in the skill group and wherein the status of the first agent in the skill group is one agent available in the skill group.

7. The system of claim 6, wherein an individual state for one of the plurality of agent skills changes from available to on communication or other and wherein the status of the first agent in the skill group changes to agent not available in the skill group.

8. The system of claim 1, wherein the first state for the plurality of agent skills in the skill group further comprises an associated time.

9. The system of claim 1, wherein the first state for the plurality of agent skills in the skill group comprises a plurality of states, wherein the plurality of states for the plurality of agent skills in the skill group each have an associated time, and wherein the processing module calculates the associated time for each of the plurality of states of agent skills in the skill group over a period of time.

10. The system of claim 9, wherein the processing module calculates the associated time for each of the plurality of states based on the minimum or maximum of the respective state.

11. The system of claim 1, wherein the first state for the plurality of agent skills in the skill group is based on one or more of the following: staffed, available, in auxiliary, on communication, or other.

12. A method comprising:
   receiving, by a microprocessor and via an electronic communication network, a plurality of electronic communications for a skill group;
   determining, by the microprocessor, that a first agent has been assigned to a plurality of agent skills in the skill group;
   receiving, by the microprocessor, information that the first agent is in a first state for the plurality of agent skills in the skill group in regard to at least one of the received plurality of electronic communications for the skill group;
   calculating, by the microprocessor, a status of the first agent in the skill group in regard to the at the least one of the received plurality of electronic communications for the skill group, wherein the status of the first agent in the skill group is calculated based on a minimum or maximum of the first state for the plurality of agent skills in the skill group, wherein calculating the maximum of the first state is based on determining if the first agent is identified in the first state for at least one of the plurality of agent skills in the skill group and wherein calculating the minimum of the first state is based on determining if the first agent is identified in the first state for all of the plurality of agent skills in the skill group;

routing, by the microprocessor, the at least one of the received plurality of electronic communications for the skill group to an agent terminal of the first agent based on the calculated status of the first agent in the skill group; and sending, by the microprocessor, the status of the first agent in the skill group, via an electronic computer network, to an administration terminal.

13. The method of claim 12, wherein the first agent is in a first contact center in a first location and further comprising:

determining, by the microprocessor, that a second agent has been assigned to the plurality of agent skills in the skill group, wherein the second agent is in a second contact center in a second location;

receiving, by the microprocessor, information that the second agent is in the first state for the plurality of agent skills in the skill group; and calculating, by the microprocessor, a status of the second agent in the skill group based on the minimum or maximum of the first state of the second agent in the skill group.

14. The method of claim 13, wherein first information about the plurality of agent skills in the skill group for the first agent is in a first format and second information about the plurality of agent skills in the skill group for the second agent is in a second format and wherein a processing module transforms the first information and/or the second information into a common format.

15. The method of claim 12, wherein the first state for the plurality of agent skills in the skill group is that the first agent is available for a plurality of skills in the skill group and wherein the status of the first agent in the skill group is one agent available in the skill group.

16. The method of claim 15, wherein an individual state for one of the plurality of agent skills in the skill group changes from available to on communication or other and wherein the status of the first agent in the skill group changes to agent not available in the skill group.

17. The method of claim 12, wherein the first state for the plurality of agent skills in the skill group further comprises an associated time.

18. The method of claim 12, wherein the first state for the plurality of agent skills in the skill group comprises a plurality of states, wherein the plurality of states each have an associated time, and wherein a processing module calculates the associated time for each of the plurality of states in the skill group over a period of time.

19. The method of claim 18, wherein a processing module calculates the associated time for each of the plurality of states based on the minimum or maximum of the respective state.

20. An apparatus for managing a contact center comprising:

means for receiving, via an electronic communication network, a plurality of electronic communications for a skill group;

means for determining that a first agent has been assigned to a plurality of agent skills in the skill group;

means for receiving information that the first agent is in a first state for the plurality of agent skills in the skill group in regard to at least one of the received plurality of electronic communications for the skill group;

means for calculating a status of the first agent in the skill group in regard to the at least one of the received plurality of electronic communications, wherein the status of the first agent in the skill group is calculated based on a minimum or maximum of the first state of the first agent in the skill group, wherein calculating the maximum of the first state is based on determining if the first agent is identified in the first state for at least one of the plurality of agent skills in the skill group and wherein calculating the minimum of the first state is based on determining if the first agent is identified in the first state for all of the plurality of agent skills in the skill group;

means for routing the at least one of the received plurality of electronic communications for the skill group to an agent terminal of the first agent based on the calculated status of the first agent in the skill group; and means for sending the status of the first agent in the skill group, via an electronic computer network, to an administration terminal.

* * * * *